May 16, 1933.  J. J. KLEINHENZ  1,909,687
DEVICE FOR PROTECTING WHEELS
Filed April 29, 1932  2 Sheets-Sheet 1
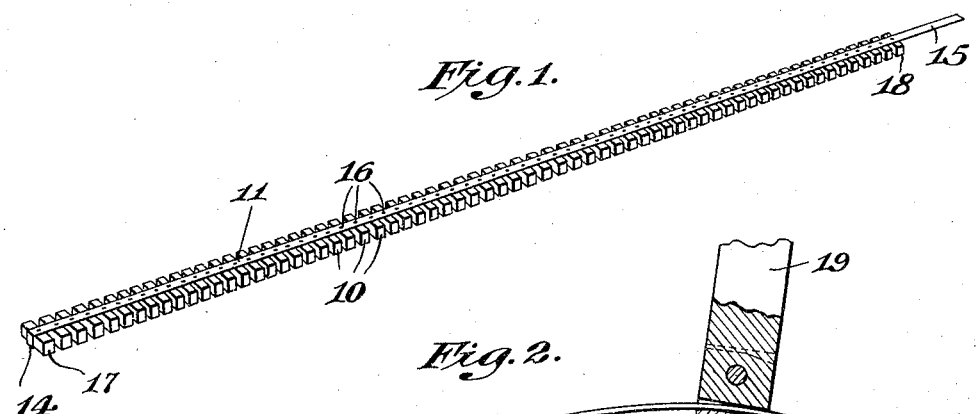
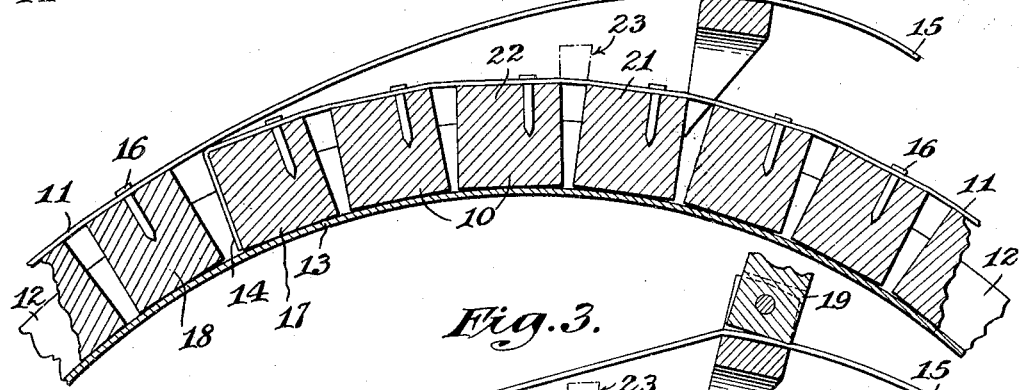
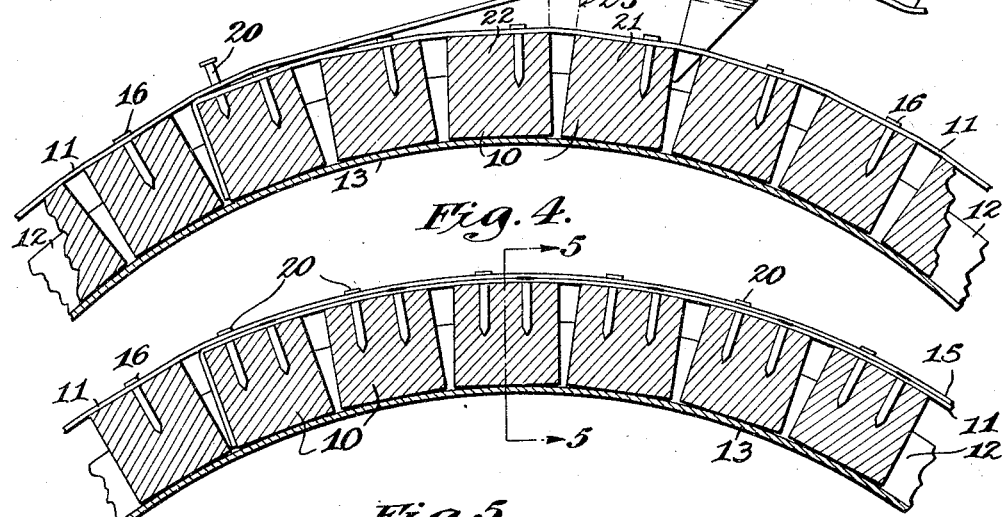
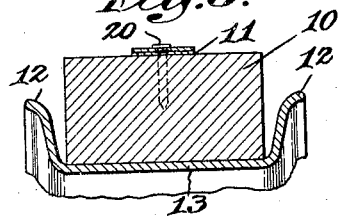
INVENTOR:
Joseph J. Kleinhenz
BY Ramsey and Kent
ATTORNEYS May 16, 1933.  J. J. KLEINHENZ  1,909,687
DEVICE FOR PROTECTING WHEELS
Filed April 29, 1932   2 Sheets-Sheet 2

INVENTOR:
Joseph J. Kleinhenz
BY Ramsey and Kent
ATTORNEYS

Patented May 16, 1933

1,909,687

UNITED STATES PATENT OFFICE

JOSEPH J. KLEINHENZ, OF ASTORIA, NEW YORK

DEVICE FOR PROTECTING WHEELS

Application filed April 29, 1932. Serial No. 608,160.

This invention relates to a method and device for protecting wheels of vehicles.

Certain classes of vehicles, particularly automobiles, have their wheels provided with radially projecting flanges or beads which normally hold the rubber tires in place. At times such vehicles are shipped without rubber tires and during such shipment it is frequently necessary to move the vehicle on its own wheels, sometimes for a considerable distance. It is the primary object of the present invention to provide a device for protecting the flanges of the wheels of the vehicle against injury when it is being moved under such circumstances.

In the preferred form of the invention a series of blocks of suitable material, such as wood, fiber, et cetera, are held in place about the periphery of the wheel by a holding band or strap of suitable material.

The protecting blocks are arranged transversely of the rim, and in preferred forms of the invention the blocks have shoulders that extend over the wheel flanges to prevent injury by any projections, such as stones or car tracks, in the road.

While preferred forms of the invention have been disclosed herein for purposes of illustration, it should be understood that various changes may be made in the structure without departing from the spirit of the invention as hereinafter set forth and claimed.

This application contains matter in common with my application Serial No. 601,106, filed March 25, 1932, and is in part a continuation of said application.

In the drawings:

Figure 1 is a perspective view of one of the protecting devices before it has been applied to a wheel.

Figure 2 is a fragmentary cross-section through part of a wheel rim showing the protector in initial position just after it has been applied to the rim.

Figure 3 is a view similar to Figure 2 but shows the parts during the fastening operation.

Figure 4 is a view similar to Figure 2 but shows the parts after they have been secured in place.

Figure 5 is a section on line 5—5 of Figure 4.

Figure 6:
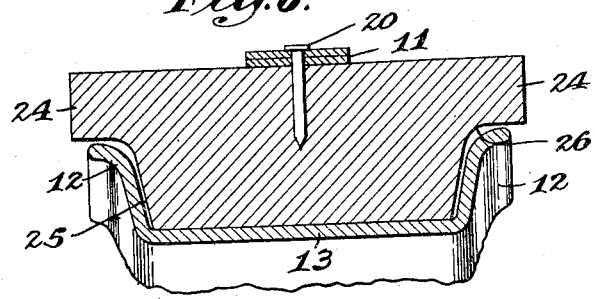
Figures 6 and 7 are views similar to Figure 5 but showing modified forms of protecting block.

Referring to the drawings more particularly, the protector consists of a plurality of blocks 10, which are preferably of wood, held together by a holding strap 11 which is preferably a piece of strap iron of suitable size and strength. Each of the blocks 10 is of a length to fit between the flanges 12 of the rim 13, and the protector is made of a length to fit about the circumference of the particular wheel to which it is to be applied. The blocks are high enough to extend a considerable distance above the tops of the flanges 12, and are arranged to extend axially (parallel to the axis of the wheel) across the rim. At the front end of the protector, the holding strap 11 can be bent down over the edge of the first block 10, as indicated at 14 in Figure 1. At the rear end of the protector the holding strap 11 is allowed to project past the last block 10 to form a free end 15.

It will be clear from the above description that the protector is of simple and inexpensive construction and that it can be rapidly assembled either by hand or by machine. In assembling the protector, the blocks are held spaced apart from each other and each block is then secured to the holding strap 11 by a suitable fastening device, such as the nail 16.

The rim 13 which carries the flanges 12 may be removable from the wheel, as in the usual wood-spoke wheels, or it may be an integral part of the wheel, as in wire wheels. The present invention can be used to protect the flanges 12 no matter how rim 13 is secured to the wheel.

In placing the protector on the rim, it is first wrapped around the rim with the last block 18 in position next to the first block 17 and with the free end 15 of the holding strap overlapping the first block 17 and extending over several blocks of the front end of the protector. The holding strap 11 is then tightened in order to clamp the protecting block 10 securely in place on the rim. This tightening of the holding strap 11 can be done by any suitable tool, such as the band tightener illustrated at 19.

After the protector has been wrapped around the wheel to the position illustrated in Figure 2, the tightening tool is inserted between two of the blocks 10 somewhere near the front end of the protector and the free end 15 of the holding strap is inserted into the tool. The handle of the tightening tool is then moved toward the right, thereby clamping the holding strap in the tool and tightening the strap around the periphery of the rim.

After the protector has been sufficiently tightened, for example, as illustrated in Figure 3, a suitable fastening device such as the nail 20 is inserted through the end 15 of the holding strap and into the first block 17. This first nail 20 will serve to hold the protector in position, and the tightening tool is removed and the entire free end 15 of the holding strap is now secured to the blocks adjacent to block 17 by nails 20.

When the parts are in the position of Figure 2, the strain of tightening the holding strap is applied directly to block 21, and in order to transfer part of this strain to the adjacent block 22, a suitable wedge member 23 may be inserted between blocks 21 and 22. In a similar manner additional wedges may be used to transfer some of the strain to still more blocks if deemed desirable. After the free end 15 has been anchored as in Figure 3 the wedge or wedges 23 are removed, the final assembled position of the parts being illustrated in Figure 4. It should be understood that any other suitable means could be used to fasten together the two ends of the holding strap.

The materials from which the protector is made are relatively inexpensive as the protecting blocks 10 are very short and if made of wood they can be made from short scraps that normally would be thrown away. The blocks 10 could also be formed from rubber, fiber, pressed paper, or any other material suitable for the purpose. The holding strap can be made of any material having the necessary strength and cheapness, although strap iron appears to be the best material now available.

It is within the scope of this invention to use two holding straps, each strap being located near one end of the blocks 10.

By using relatively narrow blocks and arranging a large number of them in close proximity to each other around the rim, it is possible to use blocks of rectangular cross-section (as viewed in Figures 2 to 4 inclusive) having flat faces in contact with the rim, and it is not necessary to curve the inner faces of the blocks to conform to the curvature of the rim. Applicant's construction is very simple and economical, and can be applied to wheels of different diameter (provided the width of rim is the same) without any changes other than providing a longer protector strip. A further advantage of applicant's construction is that the blocks of the protector can be held in place by a simple and easily-applied holding strap, thereby avoiding complicated and expensive holding devices.

While the device illustrated in Figures 1-5 provides ample protection for the rims when the vehicle is driven over a relatively smooth road, it is sometimes desirable to provide additional protection for the flanges 12 when the vehicle is likely to encounter rough roads, such as cobblestone pavements, or to cross obstructions such as car tracks. For such purposes the modifications illustrated in Figures 6 and 7 can be used.

As shown in Figure 6, each of the blocks 10 is provided with shoulders 24 which extend outwardly over the flanges 12 a sufficient distance to provide complete shields for the flanges both against blows coming upwardly towards the rim and against blows coming laterally against the rim as when the wheel is driven into side-swiping contact with a curb. In order to give the shoulders 24 the maximum of strength with the minimum of cost, the main body of each individual protecting block is formed with sloping sides 25 which follow the contour of the flanges 12, and the sides 25 curve outwardly in a fillet 26 to support the shoulders 24.

Figure 7:
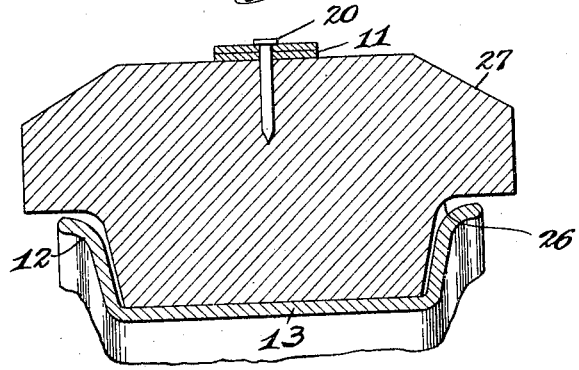
Figure 8:
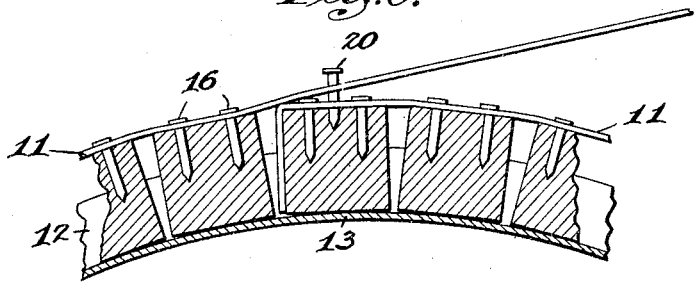
Figure 8 is a view similar to Figure 3 but with certain changes in the arrangement of the fasteners.

In the species shown in Figure 6 the block is kept at minimum depth consistent with reasonable strength of the shoulders 24. A further modification is illustrated in Figure 7, in which the block is given additional depth, and the outer corners are beveled off as shown at 27. This construction provides additional strength and protection for the shoulders 24.

Where the blocks are provided with outwardly projecting shoulders 24 it is desirable to fasten each of the blocks to the holding strap by two nails 16 spaced along opposite edges of the block, as seen in Figure 8. The additional nails 20 used to secure the free end 15 of the holding strap can be placed in the centers of the appropriate blocks.

The protectors made according to this invention are so inexpensive that they can be discarded after the vehicle reaches its destination and it is unnecessary to return them to the point of shipment.

I claim:

1. For use with a vehicle wheel having radially projecting flanges, a tread-forming member comprising a plurality of wooden blocks, a holding strip formed from flexible strap iron, the blocks being arranged transversely of the strip and individually secured to the strip in spaced relation to each other, one end of the strip extending beyond the spaced blocks, said end when the member is assembled with the rim overlying the blocks at the other end of the member, and means for securing said end to said last-mentioned blocks.

2. For use with a vehicle wheel having radially projecting flanges, a tread-forming member comprising a plurality of wooden blocks, a holding strip formed from flexible strap iron, the blocks being arranged transversely of the strip and individually secured to the strip in spaced relation to each other, one end of the strip extending beyond the spaced blocks, said end when the member is assembled with the rim overlying the blocks at the other end of the member, means for securing said end to said last-mentioned blocks, the blocks of said member being formed with parts spanning the rim between the flanges and with laterally projecting shoulders overlying said flanges.

JOSEPH J. KLEINHENZ.